United States Patent
Hall, Jr.

(10) Patent No.: US 7,468,844 B2
(45) Date of Patent: Dec. 23, 2008

(54) APPARATUS FOR ADDING RED LIGHT TO A POLARIZED LIGHT SYSTEM

(75) Inventor: Estill Thone Hall, Jr., Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 315 days.

(21) Appl. No.: 10/589,117

(22) PCT Filed: Mar. 9, 2004

(86) PCT No.: PCT/US2004/007104

§ 371 (c)(1),
(2), (4) Date: Aug. 11, 2006

(87) PCT Pub. No.: WO2005/099277

PCT Pub. Date: Oct. 20, 2005

(65) Prior Publication Data

US 2007/0188865 A1     Aug. 16, 2007

(51) Int. Cl.
*G02B 27/14* (2006.01)
*G02B 27/28* (2006.01)

(52) U.S. Cl. ............... 359/634; 359/502
(58) Field of Classification Search ............ 359/483, 359/485, 501, 502, 634; 353/20, 33; 349/9
See application file for complete search history.

(56) References Cited

U.S. PATENT DOCUMENTS

| | | | |
|---|---|---|---|
| 5,042,921 A | * | 8/1991 | Sato et al. ............ 349/9 |
| 6,409,349 B1 | * | 6/2002 | O'Connor ............ 353/31 |
| 6,623,122 B1 | | 9/2003 | Yamazaki et al. |
| 7,070,281 B2 | * | 7/2006 | Kato ............ 353/20 |
| 7,360,900 B2 | * | 4/2008 | Sakata et al. ............ 353/20 |
| 2002/0067468 A1 | | 6/2002 | O'Connor |
| 2002/0154277 A1 | | 10/2002 | Mukawa et al. |
| 2003/0156330 A1 | | 8/2003 | Edlinger et al. |

OTHER PUBLICATIONS

International Search Report PCT/ISA/210 prepared for PCT/US2004/007104, Sep. 7, 2004.
Jianmin Chen et al: "40.4: Twp-Panel Architecture for Reflective LCD Projector" SID 01 Digest, May 2001, pp. 1084-1087, XP007007741 p. 1085, column 1, line 1—line 13.
Sharp G. et al.: "LCoS Projection Color Management Using Retarder Stack Technology" Displays, Elsevier Science Publishers BV., Barking,GB, vol. 23, No. 3, Jun. 2002, pp. 139-144, XP00435156 issn: 0141-9382 p. 141, Column 2, Line 14—p. 142, Column 1, Line 18; Figure 8RL AND abstract p. 2, paragraph 1—p. 6, last line: figures 1,2 p. 9, paragraph 2.

* cited by examiner

*Primary Examiner*—David N Spector
(74) *Attorney, Agent, or Firm*—Joseph J. Laks; Harvey D. Fried; Patricia Verlangieri

(57) ABSTRACT

An apparatus for adding red light to a polarized light system includes a first light source and a second light source. A polarizing beam splitter combines S-polarized-light from the first light source and P-polarized light from the second light source. A first multi-layer filter means rotates the polarization state of the green light from the first light source to the P-polarization state. A second multi-layer filter means rotates the first light source red light to the P-polarization state and rotates the second light source red light to the S-polarization state. Finally, a reflective cleanup polarizer reflects the P-polarized-light back to the respective first and second light source and passes the S-polarized-light.

4 Claims, 1 Drawing Sheet

APPARATUS FOR ADDING RED LIGHT TO A POLARIZED LIGHT SYSTEM

This application claims the benefit, under 35 U.S.C. § 365 of International Application PCT/US2004/007104, filed Mar. 9, 2004, which was published in accordance with PCT Article 21(2) on Oct. 20, 2005, in English.

FIELD OF THE INVENTION

This invention relates to a prism arrangement separating polarized light, and in more particular, to a generic architecture for adding red light to a polarized light system.

BACKGROUND OF THE INVENTION

Liquid crystal displays (LCDs) are becoming increasingly prevalent in high-density projection display devices. These conventional high density projection-type color display devices include a light source which emits white light. Dichroic mirrors separate the white light into its corresponding red, green and blue (RGB) bands of light. These color bands of light are then directed toward a corresponding liquid crystal valve which either permits or prevents the light transmission. The RGB bands of light which are permitted to be transmitted through the light valves are then combined by a prism. A projection lens then magnifies and projects the image onto a projection screen.

A conventional liquid plate comprises lens arrays, a lens for collecting white light from a source and dichroic mirrors for separating the white light into red light, green light and blue light. A polarizing beam splitter (PBS) separates the S-polarized-light components of the red, green and blue range. It allows the separated S-polarized-light components of the light to project on reflex crystal plates and a cross dichroic prism for synthesizing the images of P-polarized-light components. The P-polarized-light components are modulated and reflected to be the output. A projection lens projects the image light on a screen.

In the current form of the technology, the production of red light is a problem when utilizing ultra-high pressure (UHP) mercury vapor arc lamps as a light source. There is not a lot of red light emanating from the UHP mercury vapor lamps. Furthermore, it is difficult to insert light from multiple sources into a system without increasing the complexity of the illumination optics. Consequently, the coupling efficiency of the light into the light valve is reduced.

The liquid crystal display device described in U.S. Pat. No. 5,537,171, entitled "Liquid Crystal Projection Display" to Ogino et el., is confined to a liquid crystal panel means, a projection lens means and a screen means that enhances relative corner illuminance without reducing light capturing efficiency. However, the liquid crystal panel means does not produce a lot of red light but rather an orange light.

The liquid crystal projector described in U.S. Pat. No. 6,343,864, entitled "Liquid Crystal Projector Equipment" to Tajiri, is confined to mounting polarizing beams splitters (PBS) in the manner where the PBS transmits more green and blue light than red light. This arrangement produces more orange light than the desired red light.

What is needed is an apparatus that will provide additional red light without reducing the coupling efficiency of the light into the light engine.

SUMMARY OF THE INVENTION

An apparatus for adding red light to a polarized light system includes a first light source and a second light source. A polarizing beam splitter combines S-polarized-light from the first light source and P-polarized light from the second light source. A first multi-layer filter rotates the polarization state of the green light from the first light source to the P-polarization state. A second multi-layer filter rotates the first light source red light to the P-polarization state and rotates the second light source red light to the S-polarization state. Finally, a reflective cleanup polarizer reflects the P-polarized-light back to the respective first and second light source and passes the S-polarized-light.

DETAILED DESCRIPTION OF THE PREFERRED EMBODIMENT

Figure 1:
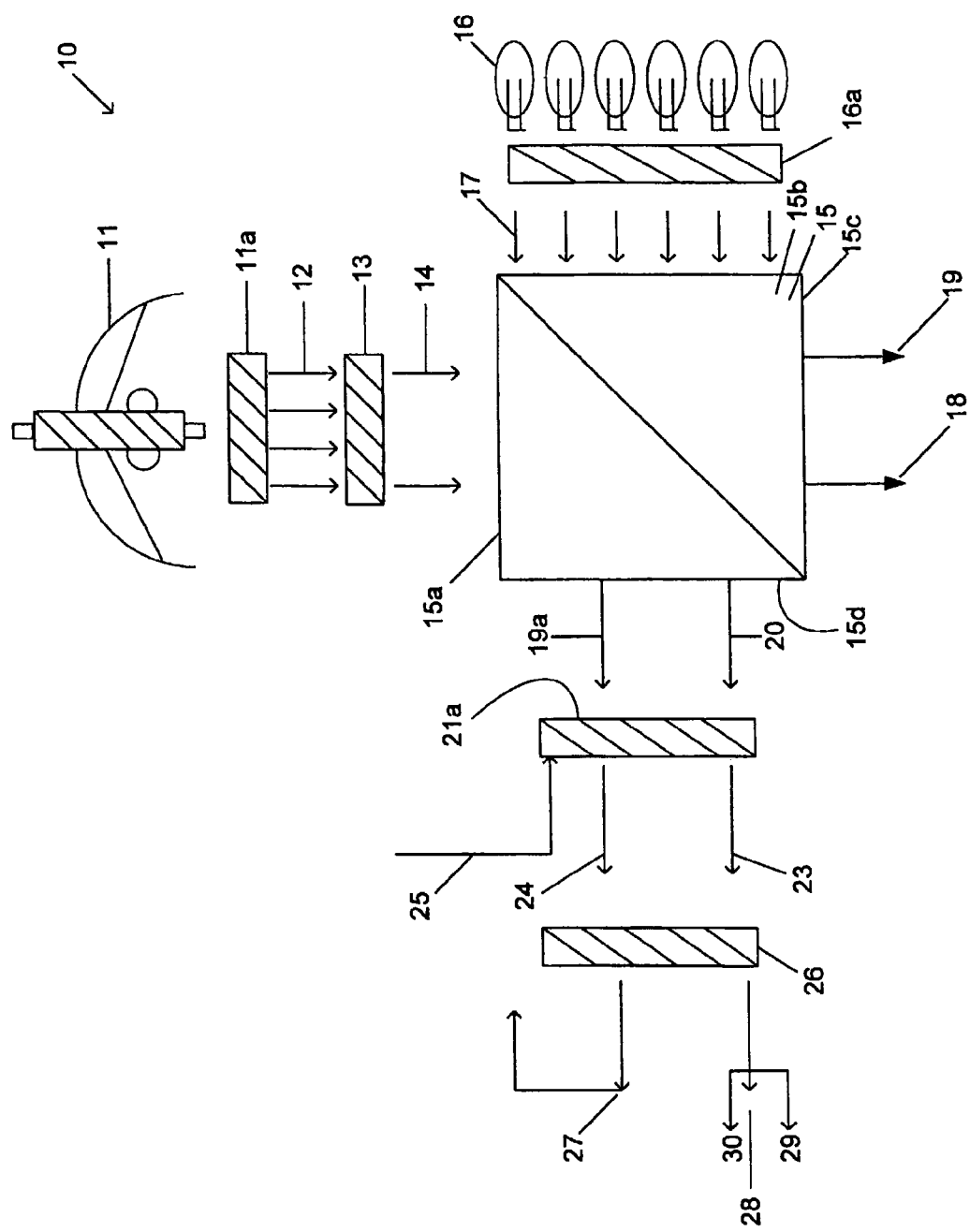
FIG. 1 illustrates the architecture For Adding Red Light To A Polarized Light System in the preferred embodiment of the invention.

While the present invention is described below with reference to a polarized light system, a practitioner in the art will recognize the principles of the present invention are applicable elsewhere.

FIG. 1 illustrates apparatus 10 in the preferred embodiment of the invention. A first light source 11 provides a first light source beam 12 of light focused onto the first multi-layer filter 13. Typically, the first light source 11 is an ultra-high pressure mercury vapor arch lamp (UHPMV). Alternately, any white light source is substitutable for UHPMV's so long as the light source exhibits the light characteristics of the UHPMV arch lamp. A first multi-layer filter 13 is optically coupled to the first side 15a of the polarizing beam splitter 15. The first multi-layer filter 13 in the preferred embodiment of the invention is a color selective half-wave retarder film such as a Red/Cyan Colorselect® plate manufactured by ColorLink® of Boulder, Colo. Furthermore, the Colorselect® plate is substitutable for any ½ wavelength plate or ½ phase plate. The first multi-layer filter 13 rotates by 90 degrees the plane of polarization to convert the S-polarized light component into the P-polarized component. The first filter S-polarized light beam 14 of red and cyan light then enters a first side 15a of the polarizing beam splitter 15.

A second light source 16 provides a second polarized light beam 17 of light focused into the second side 15b of the polarizing beam splitter 15. Typically, the second light source 16 is a red light rich source such as a halogen bulb. Alternately, any red light source is substitutable for a halogen bulb so long as the light source exhibits the light characteristics of the halogen bulb. For example, a red laser diode array is substitutable for the halogen bulb. There is no multi-layer filter means between the second light source 16 and the polarized beams splitter 15 to rotate the polarization state of the incoming light from the second light source 16 to the P-polarization state. Consequently, the non rotated states of the P-polarized and S-polarized components of the second light source 16 enter the polarizing beam splitter 15. However, the second light source 16 provides a red rich second light source P-polarized light beam 17 to the second side 15b of the polarizing beam splitter 15.

The polarizing beam splitter (PBS) 15 receives the first filter S-polarized light beam 14 at a 90 degree right angle to the second light source P-polarized light beam 17. The PBS 15 combines the S-polarized-light component from the first light source 11 and the P-polarized light from the second light source 16. Each of the light sources 11, 16 are integrated through normal integration and relay optics 11a, 16a being coupled to each light source 11, 16. This provides the second light source P-polarized light 20 and the first light source S-polarized light 19a transmitted from the fourth side 15d of the PBS 15. Furthermore, the PBS 15 combines the S-polarized light from the second source 16 and the P-polarized light from the first light source 11. This provides the first light source P-polarized light 18 and the second light source S-polarized light 19 transmitted from the third side 15c of the PBS 15. The first light source S-polarized light 19a and the second light source P-polarized light 20 is transmitted to the second multi-layer filter 21 for further processing in the architecture of apparatus 10.

A second multi-layer filter 21 is optically coupled to the fourth side 15d of the PBS 15. The second multi-layer filters 21 in the preferred embodiment of the invention is a color selective half-wave retarder film such as a Red/Cyan Colorselect® plate manufactured by ColorLink® of Boulder, Colo. Furthermore, the Colorselect® plate is substitutable for any ½ wavelength plate or ½ phase plate. The first light source S-polarized light 19a and the second light source P-polarized light 20 is received on the front side 21a of the second multi-layer filter 21. Concurrently, a second light source cyan light 22 and a first light source red light is received on the back side 21b of the second multi-layer filter 21. The second multi-layer filter 21 rotates 90 degrees the plane of polarization to convert the S-polarized light component into the P-polarized component. The output light from the backside 22b of the second multi-layer filter means 22 is the first light source red light rotated to the P-polarization state 24 and the second light source red light rotated to the S-polarization state 23.

A reflective cleanup polarizer 26 reflects the reflective cleanup P-polarized light 27 back to the respective first light source 11 and second light source 16. Furthermore, the reflective cleanup polarizer 26 transmits the reflective cleanup S-polarized light for further processing by the light engine architecture (not shown). Consequently, the output light from the reflective cleanup polarizer 26 is the second light source red light 29 and the first light source cyan light 30.

While there has been illustrated and described what is at present considered to be the preferred embodiment of the invention, it should be appreciated that numerous changes and modifications are likely to occur to those skilled in the art. It is intended in the appended claims to cover all those changes and modifications that fall within the spirit and scope of the present invention.

What is claimed is:

1. An apparatus for adding red light to a polarized light system comprising: a first white light source and a second white light source; a polarizing beam splitter for combining S-polarized-light from said first white light source and P-polarized light from said second white light source; a first multi-layer filter means for rotating the polarization state of green light from said first white light source to the P-polarization state; a second multi-layer filter means for rotating said first white light source red light to the P-polarization state and said second white light source red light to the S-polarization state; and a reflective cleanup polarizer for reflecting P-polarized-light back to respective said first and second white light sources and passing S-polarized-light for further processing.

2. The apparatus as claimed in claim 1, wherein said reflective cleanup polarizer output light is red light from said second white light source and a blue light from said first white light source.

3. The apparatus as claimed in claim 1, wherein said first and second multilayer filter means is a plurality of plates that rotates the plane of polarization by 90-degrees to convert an S-polarized light component into a P-polarized component.

4. The apparatus as claimed in claim 1, wherein said first and second multilayer layer filter means is a half wave retarder film that rotates the plane of polarization by 90 degrees to convert an S-polarized light component into a P-polarized component.

* * * * *